US011270375B1

(12) United States Patent
Jennings et al.

(10) Patent No.: US 11,270,375 B1
(45) Date of Patent: Mar. 8, 2022

(54) METHOD AND SYSTEM FOR AGGREGATING PERSONAL FINANCIAL DATA TO PREDICT CONSUMER FINANCIAL HEALTH

(71) Applicants: James Jennings, San Diego, CA (US); Danielle D'Agostino, San Diego, CA (US); Ellery Addington-White, San Diego, CA (US); Evan Francis, San Diego, CA (US); Dorian Kersch, San Diego, CA (US)

(72) Inventors: James Jennings, San Diego, CA (US); Danielle D'Agostino, San Diego, CA (US); Ellery Addington-White, San Diego, CA (US); Evan Francis, San Diego, CA (US); Dorian Kersch, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 206 days.

(21) Appl. No.: 15/800,062

(22) Filed: Oct. 31, 2017

(51) Int. Cl.
*G06Q 40/02* (2012.01)
*G06Q 40/00* (2012.01)
*G06N 20/00* (2019.01)

(52) U.S. Cl.
CPC ........... *G06Q 40/025* (2013.01); *G06N 20/00* (2019.01); *G06Q 40/125* (2013.12)

(58) Field of Classification Search
CPC ..... G06Q 40/025; G06Q 40/125; G06N 20/00
See application file for complete search history.

(56) References Cited

U.S. PATENT DOCUMENTS

| 2013/0006824 | A1* | 1/2013 | Maisonneuve | .... G06Q 30/0269 705/35 |
| 2015/0006286 | A1* | 1/2015 | Liu | ..................... G06Q 30/0269 705/14.53 |
| 2018/0048594 | A1* | 2/2018 | de Silva | .................. H04L 51/36 |
| 2018/0181558 | A1* | 6/2018 | Emery | ................ H04M 3/4936 |

FOREIGN PATENT DOCUMENTS

WO    WO-2009006452 A2 *  1/2009  ............. G06Q 40/06

OTHER PUBLICATIONS

Hao-Chen Huang, Designing a knowledge-based system for strategic planning: A balanced scorecard perspective, Expert Systems with Applications (Elsevier), 36, 2009, 209-216 (Year: 2009).*

* cited by examiner

*Primary Examiner* — Alexander G Kalinowski
*Assistant Examiner* — Alison L. Lamb
(74) *Attorney, Agent, or Firm* — Ferguson Braswell Fraser Kubasta PC

(57) ABSTRACT

A method for measuring financial health involves aggregating financial data from different data sources into a single financial data warehouse; extracting multiple customer financial characteristics from the financial data warehouse to build multiple financial profiles for a plurality of known customers; training a predictive machine learning model using the multiple financial profiles of multiple known customers to obtain a trained model; generating a grade mapping table using the trained model and a pre-defined business rule; applying the trained model to the financial data of a user to obtain a financial health score set; applying the grade mapping table to the financial data of the user to obtain a financial health grade set; and presenting the financial health grade set and the financial health score set to the user via a multimedia user interface.

16 Claims, 7 Drawing Sheets

GUI VIEW 510

Prosperity Widget Within Turbo App

Multiple people

METHOD AND SYSTEM FOR AGGREGATING PERSONAL FINANCIAL DATA TO PREDICT CONSUMER FINANCIAL HEALTH

BACKGROUND

Many credit evaluators (e.g., lenders, landlords, utility companies, small businesses, etc.) use credit scores as an indicator of personal financial health. However, the credit score is often misleading. A credit score is an abstraction of a person's creditworthiness. The credit score is a quantified expression of the likelihood of a negative lending outcome, such as default or bankruptcy. The factors that are integrated into generating a credit score, such as information about open credit lines and lending outcomes, are not a complete picture of a person's finances. These factors could be overwhelming or confusing for the average consumer trying to interpret the financial health as a whole. A more accurate metric to measure a consumer's financial health is necessary to present consumers the complex notion of financial freedom in an understandable way.

SUMMARY

In general, in one or more aspects, the invention relates to a method for measuring financial health involves aggregating financial data from different data sources into a single financial data warehouse; extracting a plurality of customer financial characteristics from the financial data warehouse to build a plurality of financial profiles for a plurality of known customers; training a predictive machine learning model using the plurality of financial profiles of multiple known customers to obtain a trained model; generating a grade mapping table using the trained model and a pre-defined business rule; applying the trained model to the financial data of a user to obtain a financial health score set; applying the grade mapping table to the financial data of the user to obtain a financial health grade set; and presenting the financial health grade set and the financial health score set to the user via a multimedia user interface.

In general, in one or more aspects, the invention relates to a system comprising: a computer processor; a financial profile repository configured to store a plurality of user financial profiles; a financial health prediction engine executing on the computer processor, accessing the financial profile repository, and configured to: aggregate financial data from different data sources into a single financial data warehouse, extract a plurality of customer financial characteristics from the financial data warehouse to build the plurality of user financial profiles for a plurality of known customers, train a predictive machine learning model using the plurality of user financial profiles of the plurality of known customers to obtain a trained model, generate a grade mapping table using the trained model and a pre-defined business rule, apply the trained model to the financial data of a user to obtain a financial health score set, and apply the grade mapping table to the financial data of the user to obtain a financial health grade set; a user data repository configured to store the plurality of user financial profiles, a plurality of financial health score sets, and a plurality of financial health grade sets; and a multimedia user interface connected to the computer processor and configured to: obtain identification information of a user, and present the financial health grade set and the financial health score set to the user.

Other aspects of the invention will be apparent from the following description and the appended claims.

DETAILED DESCRIPTION

Figure 1:
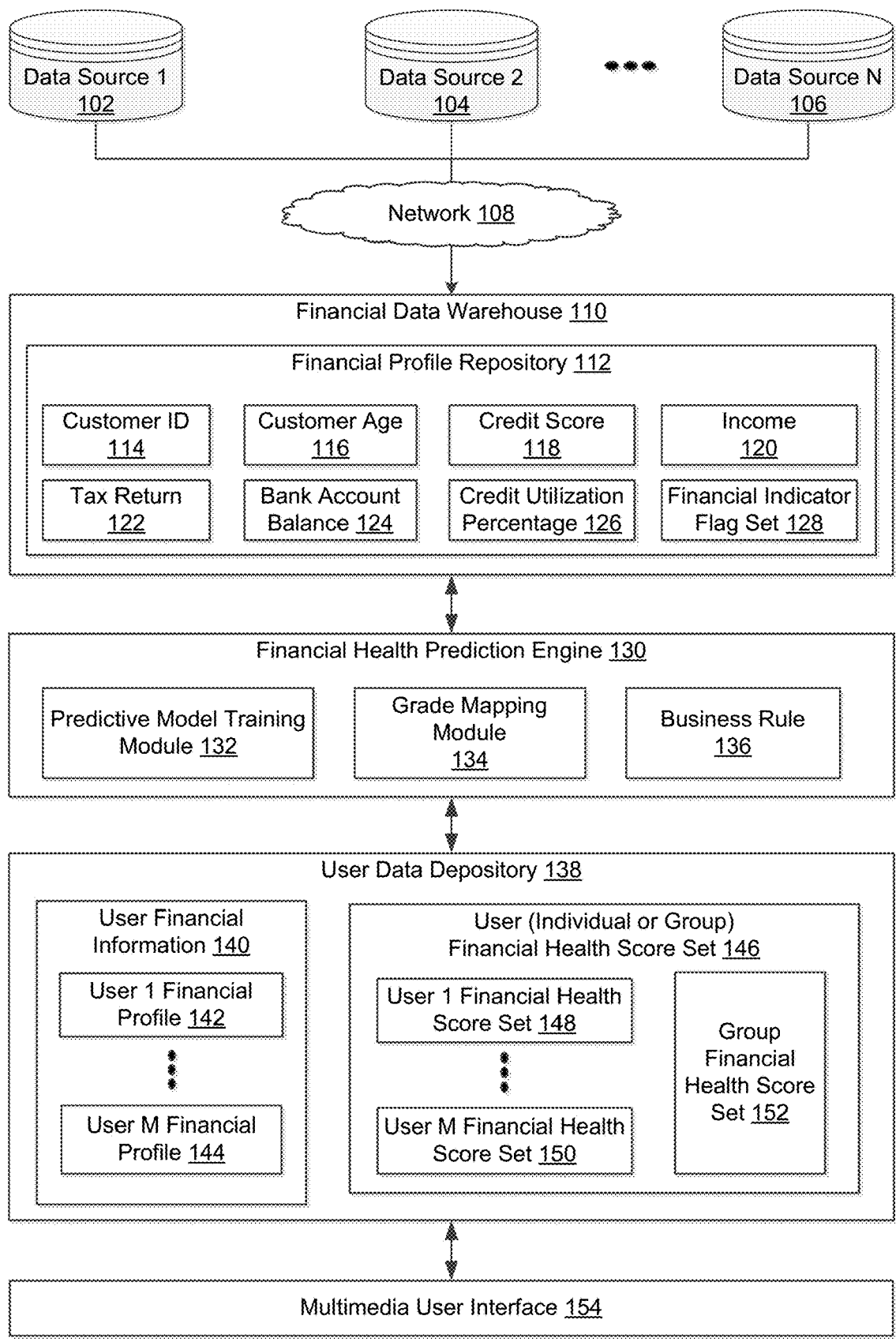
FIG. 1 depicts a schematic system diagram in accordance with one or more embodiments.

Specific embodiments will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or proceed) the second element in an ordering of elements.

Further, although the description includes a discussion of various embodiments of the invention, the various disclosed embodiments may be combined in virtually any manner. All combinations are contemplated herein.

In general, embodiments of the invention are directed to integrating aggregated personal financial data to predict a consumer's financial health. In other words, one or more embodiments are directed to developing machine learning models that aggregate this financial data together and predict a given person's financial health score. The key insight is that the attributes of the financial data about existing, known customers may be used to predict outcomes for others.

FIG. 1 is a schematic diagram showing a system for aggregating personal financial data to predict a user's financial health, in accordance with one or more embodiments. As depicted, multiple data sources including data source 1 (102), data source 2 (104), and data source N (106) are operatively connected via a computer network (108), and are aggregated into a single financial data warehouse (110).

In one or more embodiments, the financial data warehouse (110) contains a financial profile repository (112). The financial profile repository (112) may include, but is not limited to, all the customers' identification number (114), age (116), credit score (118), income (120), tax return (122), bank account balance (124), credit utilization percentage (126), and financial indicator flag set (128). In one or more embodiments the financial profile repository also includes investment assets, liabilities, etc. In one or more embodiments, the financial data warehouse (110) is operatively connected to a financial health prediction engine (130).

In one or more embodiments, the financial health prediction engine (130) includes a predictive model training module (132), a grade mapping module (134) and a business rule (136). In one or more embodiments, the user data repository (138) is operatively connected to the financial health prediction engine (130).

In one or more embodiments, the user data repository (138) may include user financial information (140) and user (individual or group) financial health score set (146). The user information (140) may include user financial profiles (e.g., user 1 financial profile (142), . . . , and user M financial profile (144)). The user (individual or group) financial health score set may include an individual user's financial health score set (e.g., user 1 financial health score set (148), . . . , and user M financial health score set (150)), and/or a group financial health score set (152). In one or more embodiments, the user data repository (138) is operatively connected to a multimedia user interface (154).

Figure 2:
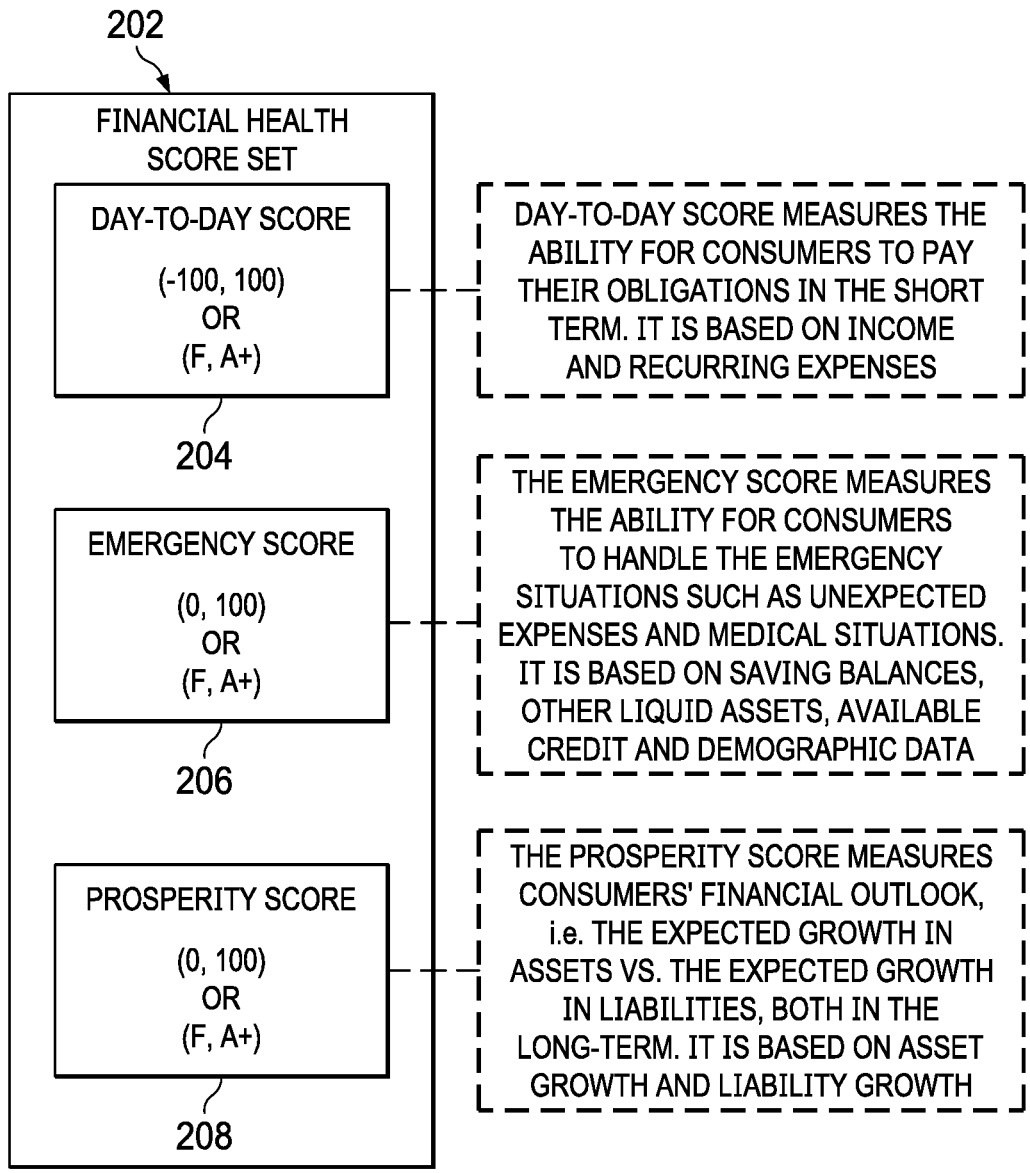
FIG. 2 depicts and explains the concept of financial health score set in accordance with one or more embodiments.

FIG. 2 depicts a block diagram of a financial health score set in accordance with one or more embodiments. In one or more embodiments of the invention, the financial health score set (202) may be a set of scores that represent financial outcomes other than negative lending situations used by credit score. The set of scores includes day-to-day score (204), emergency score (206), and prosperity score (208). These scores leverage data in different data sources and may be based on different metrics. These scores are analogous to credit scores, but instead of encapsulating creditworthiness, they represent the customers' ability to meet his or her short term financial needs, deal with unexpected financial situations, and improve the overall financial outlook, respectively.

In one or more embodiments, the day-to-day score (204) measures the ability for consumers to meet financial obligations in the short term. The day-to-day score (204) is based on income and recurring expenses. The scale may be from −100 to 100. The more negative the score is, the more unlikely the consumers can meet his or her short term financial needs. Alternatively or in combination, the day-to-day score (204) is mapped to letter grade, the range is from F (the lowest) to A+ (the highest).

In one or more embodiments, the emergency score (206) measures the ability for consumers to handle emergency situations such as unexpected expenses and medical situations. The emergency score (206) is based on saving balances, other liquid assets, available credit, and demographic data. The scale may be from 0 to 10 (with 0 being most risky, and 10 being most resilient). Alternatively or in combination, the score may be mapped to letter grade from F (the lowest) to A+ (the highest).

In one or more embodiments, the prosperity score (208) measures the consumers' financial outlook, i.e. the expected growth in assets versus the expected growth in liabilities, both in the long-term. The prosperity score (208) is based on asset growth and liability growth. The asset growth may include income growth and investment portfolio growth rate, where the income growth is projected based on occupation and demographics. The liability growth is projected based on debt pay-down rate. The scale of the prosperity score may be from 0 to 100. The higher the score indicating the more financial freedom a consumer has. Alternatively or in combination, the score can be mapped to letter grade from F (the lowest) to A+ (the highest).

In one or more embodiments, the financial health score may be generated for a single user or a group of users. For example, an individual user may want to check his/her own financial health score and check how he/she is doing compared to people like him/her. In certain situations, a group of people may want to obtain a score for the group as a whole. For example, a landlord may want to check the financial health score of tenants as a group. Another example is that a business, such as a commercial bank, may want to check the financial health scores of its customers to make marketing decisions.

Figure 3:
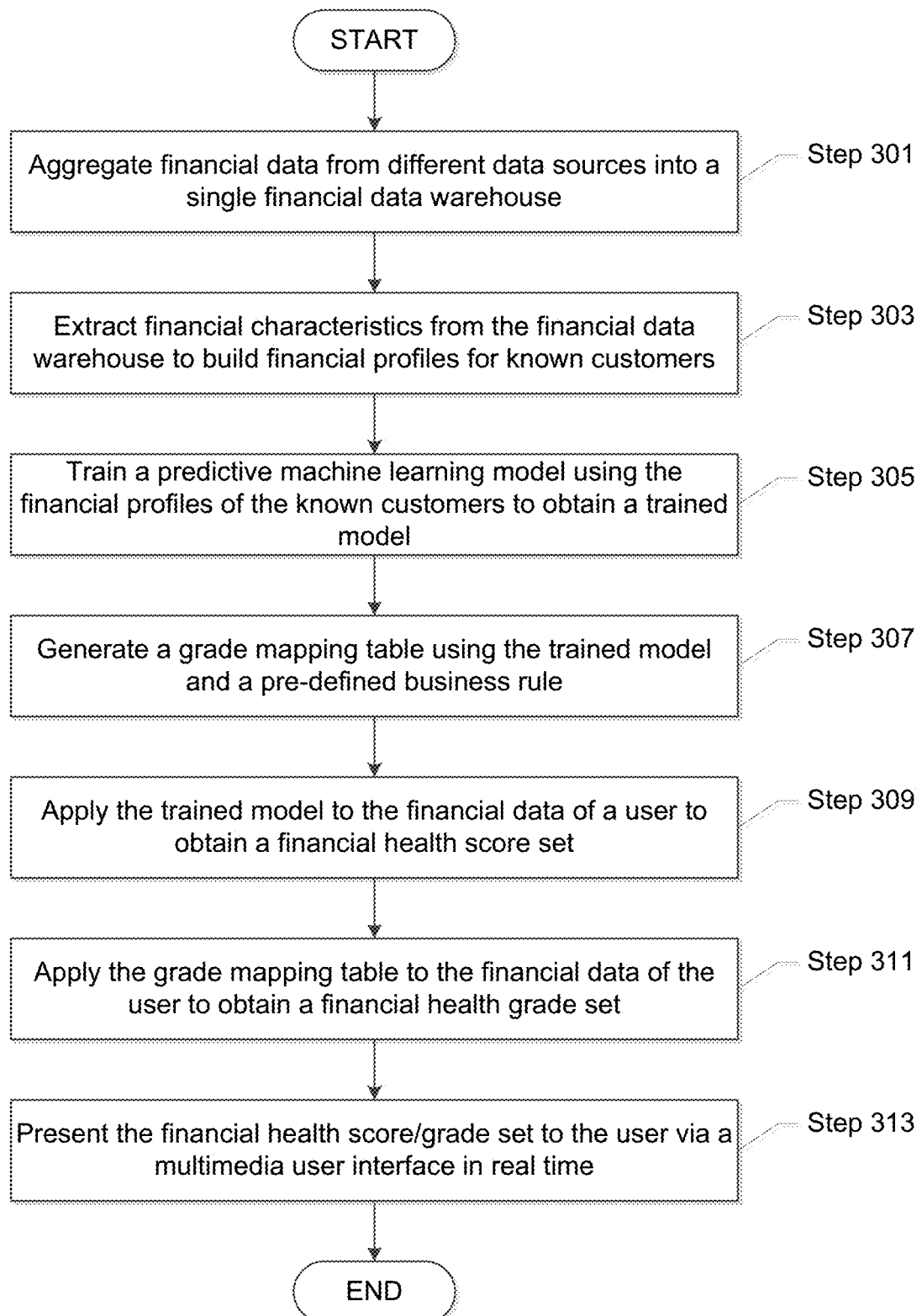
FIG. 3 and FIG. 4 depict flowchart diagrams in accordance with one or more embodiments.

FIG. 3 depicts a flowchart diagram of a process for aggregating personal financial data to predict a consumer's financial health, in accordance with one or more embodiments. In one or more embodiments, one or more of the operations shown in FIG. 3 may be performed on clustered computers running distributed-computing software that supports batch processing based on a Map-Reduce architecture (e.g., Hadoop). In one or more embodiments, one or more of the operations shown in FIG. 3 may be performed on clustered computers running distributed-computing software that supports stream processing based on a Map-Reduce architecture (e.g., Hadoop YARN). In one or more embodiments, some of the operations shown in FIG. 3 may be performed by software (e.g., a client application including, for example, a webpage with embedded JavaScript or ActionScript) running on a client device (e.g., personal computer or mobile device).

In operation 301, the financial data from one or more different data sources is aggregated into a single financial data warehouse. The data sources may be from multiple sub-domains including tax, credit reports and financial transactions, etc. For example, the data sources may be from consumer finance sources using a personal financial application (such as Mint), tax sources using a tax preparation and filing application (such as TurboTax), and/or credit report data from one or more credit reporting services (such as Transunion or Equifax).

In operation 303, a set of customer financial characteristics are extracted for all know customers from all or a portion of the data stored in the financial data warehouse. The set of financial characteristics may include, but is not limited to, age, income, credit utilization percentage, etc. Using the extracted financial characteristics, a set of financial indicator flags is generated for each known customer. The set of financial indicator flags represent whether indicators of a financial situation of interest are found. For example, the indicators may include a scenario where the bank account is below zero balance, a bankruptcy is filed, or a house is recently bought, etc. In one or more embodiments, at least one of the set of flags is a Boolean indicator of a financial situation of interest.

Further, in operation 303, financial profiles are built based on the set of financial characteristics and the financial indicator flag sets for all the customers. As a result, a financial profile includes, but is not limited to, a customer's identification number, age, income, credit utilization percentage, credit score, tax return, bank account balance, and the financial indicator flag set.

In operation 305, a predictive machine learning model is trained using the financial profiles of the known customers to obtain a trained model. The model is trained to use the extracted financial characteristics to predict the financial indicator flag set generated for the financial profile. In one or more embodiments, the predictive machine learning model is one of the following models: a linear aggression based model, a decision tree based model, a Bayesian network model, a support vector machine model, a nearest neighbor model, a neural networks model, a deep neural networks model, etc. The prediction is interpreted as the probability of a customer having the financial indicator flag set. The prediction implies the probability that a customer will actually be in the financial situation indicated by the financial indicator flag set. The output of operation 305 is a trained model, which persists for use in the following operations.

In operation 307, a grade mapping table is generated using the trained model and a pre-defined business rule in accordance with one or more embodiments. The pre-defined business rule defines a percentage of users in each pre-defined grade bucket, where the grade bucket may be identified using a grading scale from A+ (highest) to F (lowest).

In operation 309, the trained model is applied to the financial data of a user or a group of users to obtain a financial health score set for a user or a group of users in accordance with one or more embodiments.

In operation 311, the grade mapping table is applied to the financial data of the user to obtain a financial health grade set in accordance with one or more embodiments. The financial health grade may be a report-card style grade in the range of A+ (highest) to F (lowest).

In operation 313, the financial health score or grade set is presented to the user or a group of users via a multimedia user interface (MUI) in accordance with one or more embodiments. The MUI may include a graphical user interface (GUI) in combination with audio and/or video capabilities or interfaces. For example, the system and GUI used for predicting financial health score may be integrated with a web interface, such as Facebook Messenger, that supports voice and video communications.

In one or more embodiments, the financial health score/grade set is generated and presented to a user in real time or near real time. In other words, the financial health score/grade set may be presented to the user almost immediately (at least as it appears to the user) after the user information is input.

Figure 4:
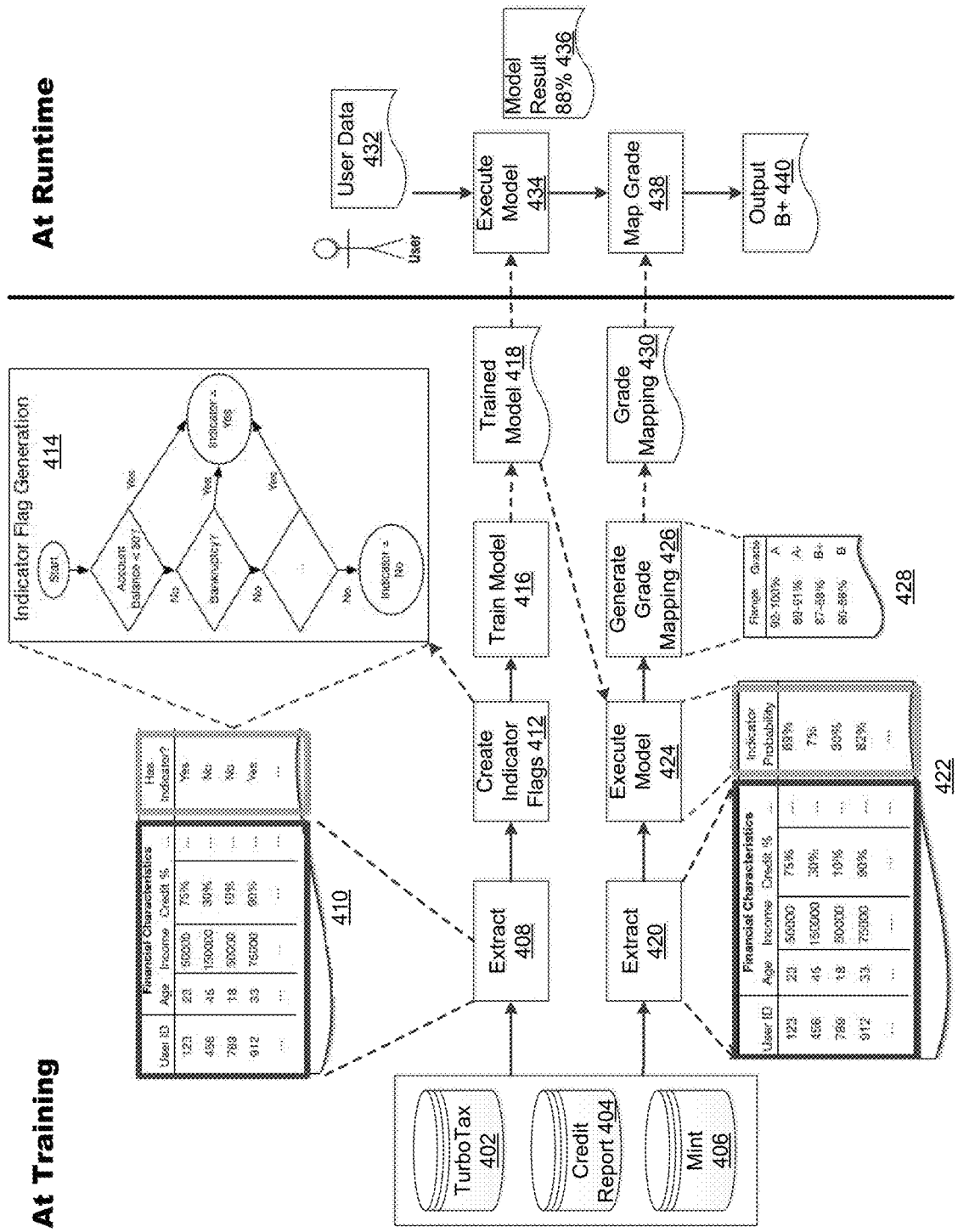

FIG. 4 is a detailed flowchart that depicts an exemplary implementation of the process described in FIG. 3, in accordance with one or more embodiments. By way of an example, among a large population of customers, some customers are not able to meet his/her monthly expenses. The historical data about this large population of customers may be mined to predict a user's ability to meet his/her monthly expenses.

In this example, the data sources are from tax data sources using TurboTax (402), credit report data sources (404), and consumer finance data sources using Mint (406). The financial data from these data sources are aggregated. In Step (408), a set of financial characteristics (410) are extracted for all users from the aggregated financial data.

In Step 412, using the extracted financial characteristics, a set of indicator flags is generated for each user. These flags represent whether there are indicators of a financial situation of interest. The flow chart (414) depicts the process of financial indicator flag generation. In this example, the financial situation of interest is bank account balance below zero or the filing of a bankruptcy. When the account balance below zero or the bankruptcy is filed, the indicator is set to "Yes"; otherwise, the indicator is set to "No". The data type of the indicator flag is Boolean for the purposes of this example.

In Step (416), a predictive machine learning model is trained to take the financial characteristics extracted, and use those extracted financial characteristics to predict the indicator flag set generated in Step (412). The prediction result is interpreted as the probability of a user having the indicator flag set. This indicator implies the probability that a user will be in the financial situation of interest. The output of the model training module is a trained model (418), which is persisted for use later.

After the model is trained, the next step is to generate a grade mapping table. In Step (420), the financial characteristics are again extracted, but in this example no need exists to create the financial indicator flag set as in step (412).

In Step (424), the trained model (418) is loaded, and the trained model (418) is executed for each user in the extracted data (422). As a result, each user's financial characteristics is passed into the trained model, which returns the probability that the user would have the indicator flag set and thus be in the financial situation of interest.

In Step (426), the predictions made in Step (424) are used to create a mapping from indicator probability to a letter grade. This step analyzes the distribution of probabilities the model outputs in Step (424), and uses business rules to determine how many users should be in each grade bucket, creates a grade mapping table that maps the probability ranges to letter grades (for example, from A+ to F) (428). The resulting grade mapping table (430) is persisted for use at runtime.

At runtime, a user may want to know how he/she is trending regarding his/her ability to meet monthly expenses. The user may or may not have been included in the customers extracted in Step (408) and Step (420). The user enters data via a MUI. The set of financial characteristics obtained from the user data (432) are pre-fetched to pass to the financial health prediction system as parameters.

In Step (434), the trained model (418) is loaded and applied to the financial characteristics of the user, which results in a probability. For example, the modeling result (436) is a probability of 88%. This probability represents the likelihood of this user having the financial indicator flag set.

In Step (438), the probability output of the model is mapped to a letter grade from A+ (highest) to F (lowest) using the grade mapping table. For example, the probability of 88% is mapped to grade B+ (440). The grade B+ is then returned to the financial health prediction system for presentation to the user via the MUI.

Figure 5A:
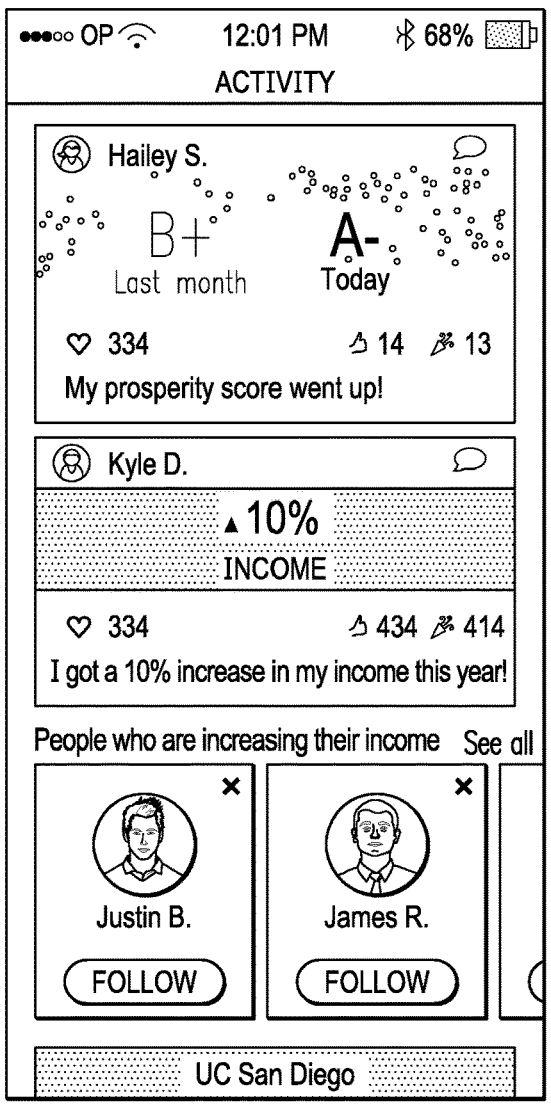
FIG. 5A and FIG. 5B depict graphical user interface (GUI) views in accordance with one or more embodiments.
Figure 5A:
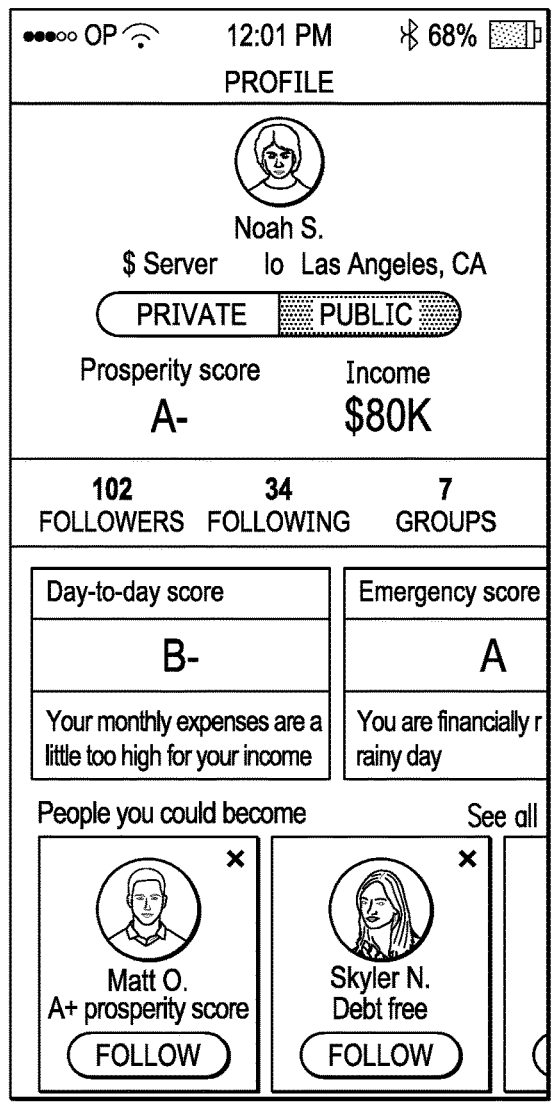
Figure 5A:
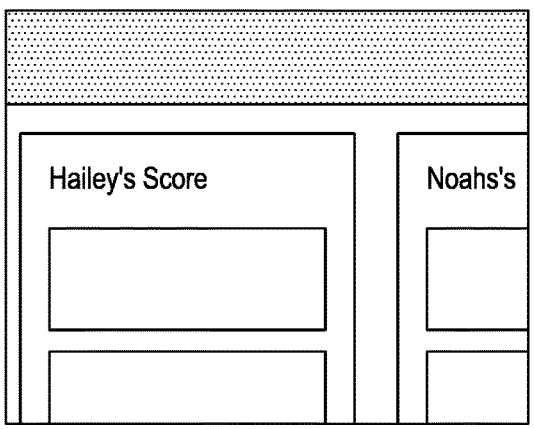
Figure 5A:
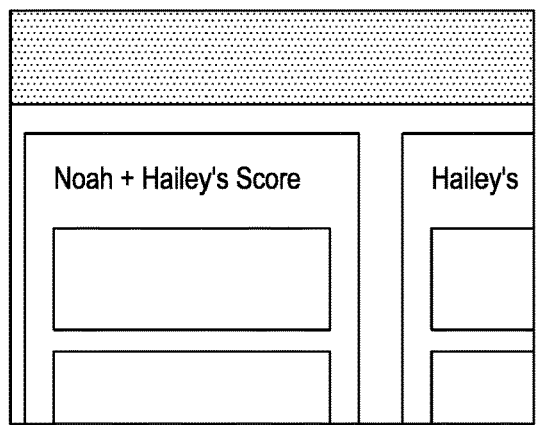
Figure 5B:
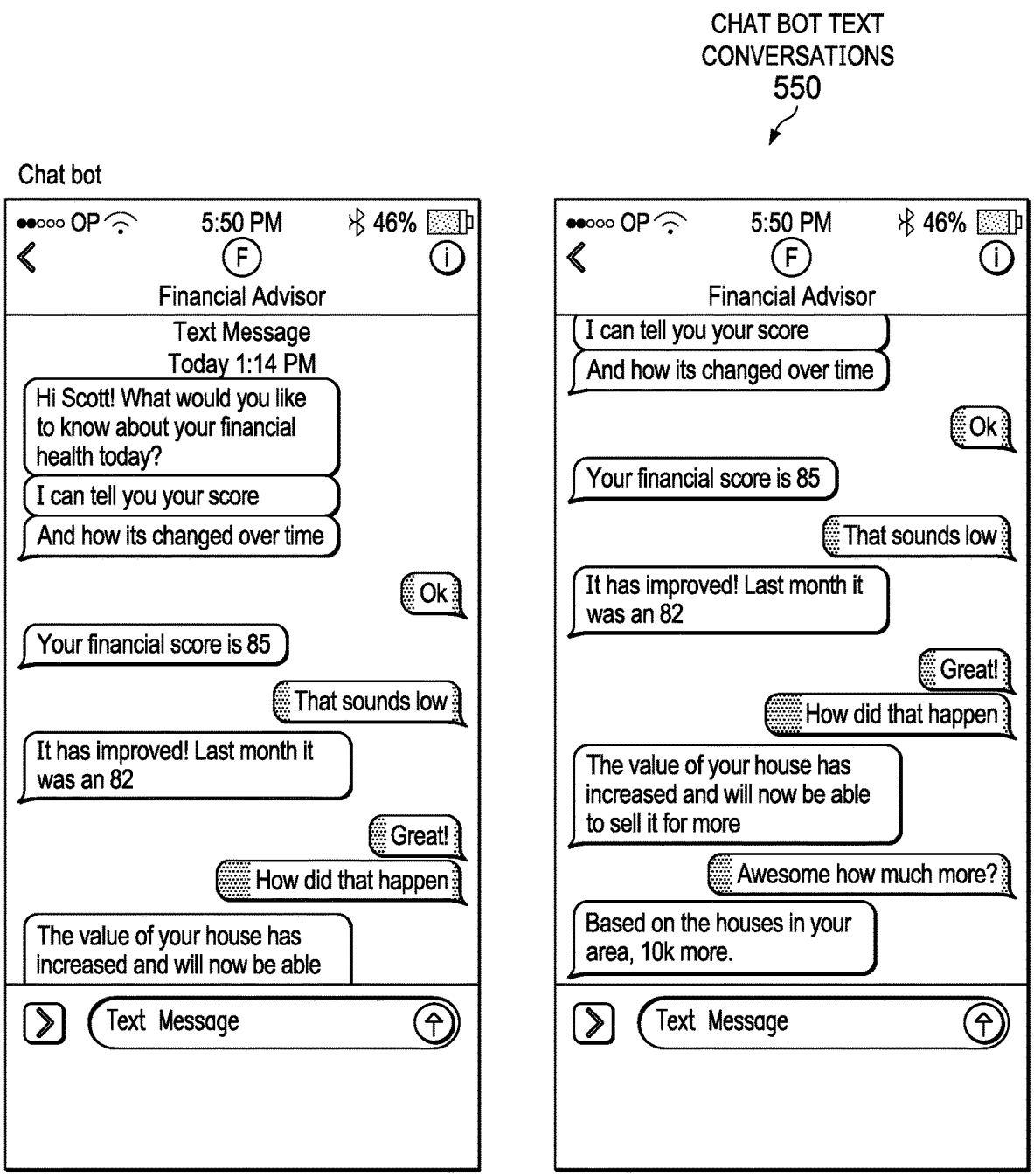

The following use cases described below and shown in FIG. 5A and FIG. 5B are for explanatory purposes only and not intended to limit the scope of the invention. FIG. 5A depicts a GUI view (510) enabling a user or multiple users to obtain a financial health score set, in accordance with one or more embodiments. As depicted, Hailey S is able to view that her prosperity score increased from B+ to A−. Kyle D is able to view that his income increased 10%, and Kyle may also follow people who are "like him" Noah S. observes that his prosperity score is A−, day-today score is B−, and emergency score is A. Noah is also able to follow people whom he would "like to become", for example, people who have A+ prosperity score or people who are debt free. Noah and Hailey are also to request a financial health score for them as a group.

FIG. 5B shows Chat Bot text conversations (550) between a user and the financial health score prediction system, in accordance with one or more embodiments of the invention. In this GUI example, the financial health score prediction system is integrated with Chat Bot, which is a computer program that conducts a conversation via auditory or textual methods. The financial health score prediction system works as a virtual assistant to communicate with the users and help the users understand his/her financial health scores.

Figure 6A:
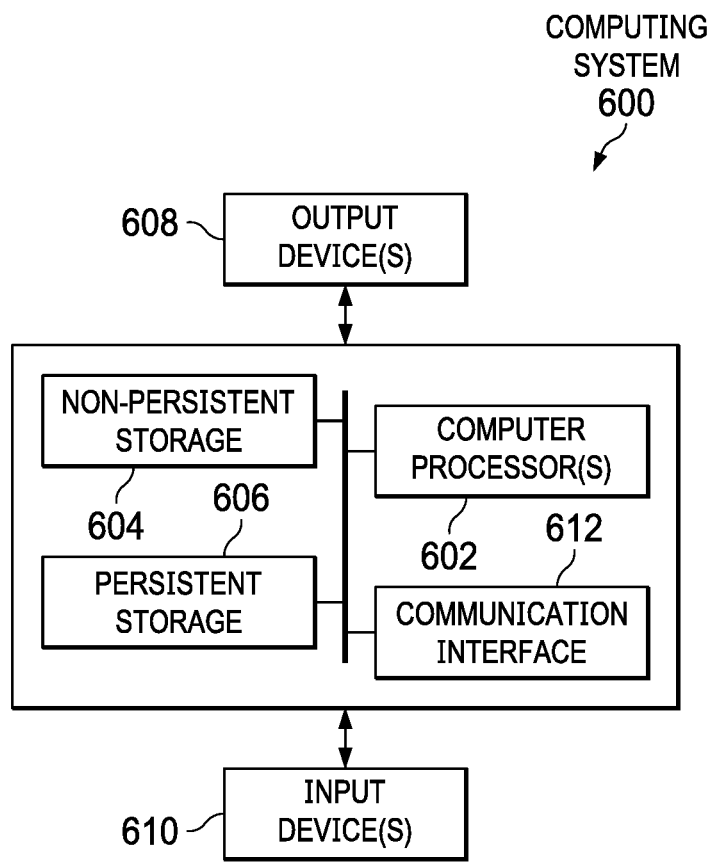
FIG. 6A and FIG. 6B depict diagrams showing a computing system, in accordance with one or more embodiments.

Embodiments of the invention may be implemented on a computing system. Any combination of mobile, desktop, server, router, switch, embedded device, or other types of hardware may be used. For example, as shown in FIG. 6A, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 6B:
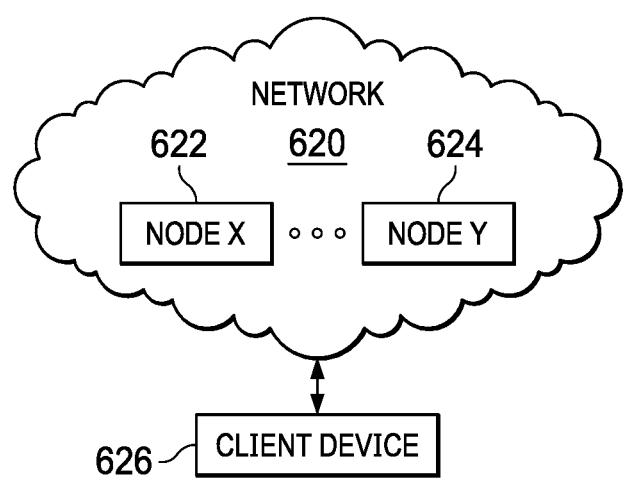

The computing system (600) in FIG. 6A may be connected to or be a part of a network. For example, as shown in FIG. 6B, the network (620) may include multiple nodes (e.g., node X (622), node Y (624)). Each node may correspond to a computing system, such as the computing system shown in FIG. 6A, or a group of nodes combined may correspond to the computing system shown in FIG. 6A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (600) may be located at a remote location and connected to the other elements over a network.

Although not shown in FIG. 6B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6A. Further, the client device (626) may include and/or perform all or a portion of one or more embodiments of the invention.

The computing system or group of computing systems described in FIG. 6A and FIG. 6B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 6A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 6A, while performing one or more embodiments of the invention, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 6A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 6A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 6A and the nodes and/or client device in FIG. 6B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for measuring financial health, comprising:
aggregating financial data of a user from different data sources into a single financial data warehouse;
extracting a plurality of customer financial characteristics from the financial data warehouse to build a plurality of financial profiles for a plurality of known customers;
training a predictive machine learning model using the plurality of financial profiles of the plurality of known customers to obtain a trained model;
generating a grade mapping table using the trained model and a pre-defined business rule,
wherein generating the grade mapping table comprises:
predicting, using the trained model, a plurality of probabilities that corresponding customers of the plurality of known customers are associated with at least one financial indicator flag;
defining a plurality of ranges of probabilities from the plurality of probabilities; and
assigning, by the pre-defined business rule and in the grade mapping table, each one of the plurality of ranges of probabilities to a corresponding pre-defined grade bucket, the corresponding pre-defined grade bucket comprising a letter grade of a plurality of letter grades;
applying the trained model to the financial data of the user to obtain a financial health score set;
applying the grade mapping table to the financial data of the user by mapping, using the grade mapping table, the financial health score set to at least one of the plurality of letter grades in order to obtain a financial health grade set comprising the at least one of the plurality of letter grades; and
presenting the financial health grade set and the financial health score set to the user via a multimedia user interface configured for the user to interact with the multimedia user interface during presentation of the financial health grade set and the financial health score set.

2. The method of claim 1, wherein extracting the plurality of customer financial characteristics further comprises:
creating a set of flags for each of the plurality of known customers, wherein at least one of the set of flags is a Boolean indicator of a financial situation of interest; and
adding the set of flags for each of the plurality of known customers to the plurality of customer financial characteristics to build financial profiles for the plurality of known customers.

3. The method of claim 1, wherein the plurality of financial profiles comprises at least a customer's identification number, age, income, credit utilization percentage, credit score, tax return, bank account balance, and financial indicator flag set.

4. The method of claim 1, wherein the financial health grade set and the financial health score set are generated for a group of users.

5. The method of claim 1, wherein identification information of the user is entered via the multimedia user interface.

6. The method of claim 1, wherein the financial health grade set and the financial health score set are generated in real time.

7. A system comprising:
a computer processor;
a financial profile repository configured to store a plurality of user financial profiles;
a financial health prediction engine executing on the computer processor, accessing the financial profile repository, and configured to:

aggregate financial data of a user from different data sources into a single financial data warehouse, extract a plurality of customer financial characteristics from the financial data warehouse to build the plurality of user financial profiles for a plurality of known customers, train a predictive machine learning model using the plurality of user financial profiles of the plurality of known customers to obtain a trained model, generate a grade mapping table using the trained model and a pre-defined business rule, wherein the financial health prediction engine is further configured to generate the grade mapping table by being configured to:

predict, using the trained model, a plurality of probabilities that corresponding customers of the plurality of known customers are associated with at least one financial indicator flag;

define a plurality of ranges of probabilities from the plurality of probabilities; and assign, by the pre-defined business rule and in the grade mapping table, each one of the plurality of ranges of probabilities to a corresponding pre-defined grade bucket, the corresponding pre-defined grade bucket comprising a letter grade of a plurality of letter grades, apply the trained model to the financial data of the user to obtain a financial health score set, and apply the grade mapping table to the financial data of the user by mapping, using the grade mapping table, the financial health score set to at least one of the plurality of letter grades in order to obtain a financial health grade set comprising the at least one of the plurality of letter grades;

a user data repository configured to store the plurality of user financial profiles, a plurality of financial health score sets, and a plurality of financial health grade sets; and a multimedia user interface connected to the computer processor and configured to:

obtain identification information of a user, present the financial health grade set and the financial health score set to the user, and interact with the user while presenting the financial health grade set and the financial health score.

8. The system of claim 7, wherein the financial health prediction engine is further configured to:

create a set of flags for each of the plurality of known customers, wherein at least one of the set of flags is a Boolean indicator of a financial situation of interest; and add the set of flags for each of the plurality of known customers to the plurality of customer financial characteristics to build financial profiles for the plurality of known customers.

9. The system of claim 7, wherein the financial health score set and the financial health grade set are generated for a group of users.

10. The system of claim 7, wherein the financial health score set and the financial health grade set are generated in real time.

11. A non-transitory computer readable medium comprising instructions for measuring financial health which, when executed by a computer, cause a computer processor to:

aggregate financial data of a user from different data sources into a single financial data warehouse;

extract a plurality of customer financial characteristics from the financial data warehouse to build a plurality of financial profiles for a plurality of known customers;

train a predictive machine learning model using the plurality of financial profiles of the plurality of known customers to obtain a trained model;

generate a grade mapping table using the trained model and a pre-defined business rule, wherein generating the grade mapping table comprises:

predicting, using the trained model, a plurality of probabilities that corresponding customers of the plurality of known customers are associated with at least one financial indicator flag;

defining a plurality of ranges of probabilities from the plurality of probabilities; and assigning, by the pre-defined business rule and in the grade mapping table, each one of the plurality of ranges of probabilities to a corresponding pre-defined grade bucket, the corresponding pre-defined grade bucket comprising a letter grade of a plurality of letter grades;

apply the trained model to the financial data of the user to obtain a financial health score set;

applying the grade mapping table to the financial data of the user by mapping, using the grade mapping table, the financial health score set to at least one of the plurality of letter grades in order to obtain a financial health grade set comprising the at least one of the plurality of letter grades; and present the financial health score set and the financial health grade set to the user via a multimedia user interface configured for the user to interact with the multimedia user interface during presentation of the financial health grade set and the financial health score set.

12. The non-transitory computer readable medium of claim 11, further comprising instructions which, when executed by the computer, cause the computer processor to:

create a set of flags for each of the plurality of known customers, wherein at least one of the set of flags is a Boolean indicator of a financial situation of interest; and add the set of flags for each of the plurality of known customers to the plurality of customer financial characteristics to build financial profiles for the plurality of known customers.

13. The non-transitory computer readable medium of claim 11, wherein the financial health score set and the financial health grade set are generated for a group of users.

14. The non-transitory computer readable medium of claim 11, wherein the financial health score set and the financial health grade set are generated in real time.

15. The method of claim 1, wherein the multimedia user interface comprises a chatbot, and wherein the method further comprises:

after presenting the financial health grade set and the financial health score set to the user, receiving via the chatbot an inquiry from the user regarding at least one of the financial health grade set and the financial health score set; and responding automatically to the inquiry via the chatbot.

16. The method of claim 1, further comprising:

integrating the multimedia user interface with a pre-existing Web interface.

* * * * *